US006293427B1

(12) United States Patent
Cutting

(10) Patent No.: US 6,293,427 B1
(45) Date of Patent: Sep. 25, 2001

(54) BEVERAGE DISPENSING MACHINE

(76) Inventor: Bruce R. Cutting, 40 Shirley Avenue, Kitchener, Ontario (CA), N2B 2E1

( * ) Notice: Subject to any disclaimer, the term of this patent is extended or adjusted under 35 U.S.C. 154(b) by 0 days.

(21) Appl. No.: 09/781,263

(22) Filed: Feb. 13, 2001

Related U.S. Application Data

(60) Provisional application No. 60/182,180, filed on Feb. 14, 2000.

(51) Int. Cl.[7] .............. G01F 13/00
(52) U.S. Cl. .............. 222/2
(58) Field of Search .............. 222/2, 153.14, 222/156, 146.2, 146.5, 509

(56) References Cited

U.S. PATENT DOCUMENTS

| | | | | |
|---|---|---|---|---|
| 3,247,940 | * | 4/1966 | Christine et al. | 222/2 |
| 3,565,228 | * | 2/1971 | Young | 222/2 |
| 4,651,862 | * | 3/1987 | Greenfield, Jr. | 222/146.2 |

* cited by examiner

*Primary Examiner*—Philippe Derakshani
(74) *Attorney, Agent, or Firm*—Daryl W. Schnurr

(57) ABSTRACT

A beverage dispenser has a coin dispenser mounted between a base and an insulated liquid storage container. The dispenser is not connected to an electrical power source. The coin mechanism increases the overall height by approximately 1/32 inches and prevents operation of the dispenser unless an appropriate coin or coins are first inserted into a coin slot.

9 Claims, 4 Drawing Sheets

BEVERAGE DISPENSING MACHINE

This application claims benefit of Prov. No. 60/182,180 filed Feb. 14, 2000.

BACKGROUND OF THE INVENTION

1. Field of the Invention

This invention relates to an insulated beverage dispenser having a coin mechanism thereon and more particularly to a vacuum bottle with a coin mechanism.

2. Description of the Prior Art

Coin operated beverage dispensing machines are known where the beverage is dispensed in bulk from a supply container upon insertion of a coin or coins into a coin slot. Previous machines are electrically or electronically operated and they are extremely expensive, complex and cumbersome. Vacuum bottles are thermally insulated containers with a dispensing valve thereon. Vacuum bottles are also known. The vacuum bottles are portable and much smaller than the dispensing machines. For example, a vacuum bottle will usually have a capacity of less than one gallon and will be approximately the same size as a conventional domestic coffee maker. These vacuum bottles do not have coin mechanisms thereon. When vacuum bottles or coffee makers are used in businesses, institutions or other organizations to provide beverages to staff members or other users, the users are often required to pay for the beverages consumed on an honorary basis. Often, a user will consume a beverage when he/she does not have the right amount of change to pay for it and intend to pay later on. The user will often then forget to pay later on and beverage dispensing systems where payment is based on the honor system do not operate satisfactorily as some users pay diligently and other users seldom pay at all.

SUMMARY OF THE INVENTION

It is an object of the present invention to provide a beverage dispenser with a coin mechanism thereon whereby beverages cannot be removed through an outlet valve of the dispenser without first inserting an appropriate coin or coins into the coin mechanism. Preferably, the dispenser and coin mechanism contain no electrical or electronic connections and are mechanically operated.

A beverage dispenser has a coin mechanism thereon. The beverage dispenser is an insulated vacuum bottle with a dispensing valve. The coin mechanism controls the dispensing valve so that a beverage within the dispenser cannot be discharged through the dispensing valve unless an appropriate coin or coins are inserted into a coin slot of the coin mechanism.

Preferably, the height of the coin mechanism does not exceed substantially 1.5 inches. Still more preferably, the coin mechanism is tapered so that a height of the mechanism converges as the coin mechanism extends away from the dispenser, the maximum height being substantially 1.5 inches and the minimum height being substantially 0.75 inches.

Preferably, the coin mechanism has little effect on the overall height of the dispenser.

DETAILED DESCRIPTION OF A PREFERRED EMBODIMENT

Figure 1:
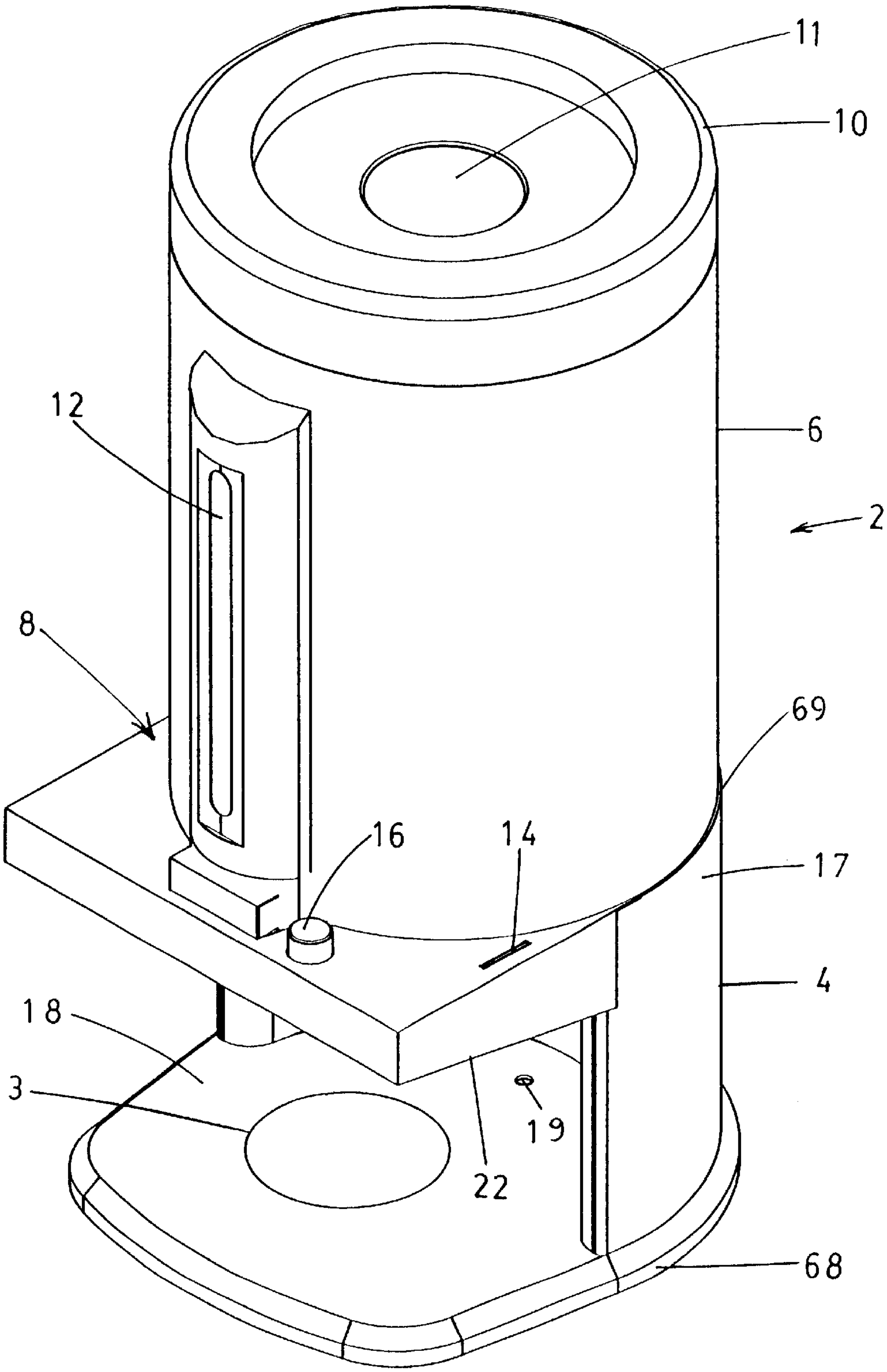
In FIG. 1, there is shown a perspective view of the beverage dispenser and coin mechanism.

In FIG. 1, a beverage dispenser 2 has a base 4, a liquid storage container 6 and a coin mechanism 8. The storage container 6 is preferably insulated (not shown) and has a top 10 with a mouth 11. The top 10 has a removable cover (not shown). The container 6 also has a level indicator 12 extending along a front thereof The coin mechanism 8 is affixed between the storage container 6 and the base 4. The coin mechanism 8 has a coin slot 14 and a control button 16. The base 4 has a side wall 17. The side wall 17 has a substantially semi-circular cross-sectional shape. The base has a surface 18 for receiving a cup (not shown) or other container to be filled with liquid. As can be seen from FIG. 1, the base 4 is open at the front so that a cup (not shown) can be readily inserted beneath an outlet valve (not shown) extending from the storage container 6 through the coin mechanism 8. The surface 18 has a screw hole 19.

The beverage dispenser and coin mechanism can be used to dispense any liquid but are likely to be most often used to dispense coffee. The coin mechanism can be designed to be operable when a particular coin or more than one particular coin are inserted into the coin slot 14. The coin mechanism can also be designed to operate with tokens. A cup is placed in an appropriate position, preferably on a cup locator marking 13 on the surface 18, beneath the outlet valve and the button 16 is manually depressed to cause liquid to flow from the storage container 6 through the outlet valve (not shown) into the cup (not shown). When the cup is filled to the desired level, the button 16 is released. The spent coin or coins proceed into a storage bin (not shown) within the coin dispenser. When the button 16 is released, it cannot be depressed again until an appropriate coin or a number of appropriate coins are inserted into the coin slot 14 to repeat the process.

Figure 2:
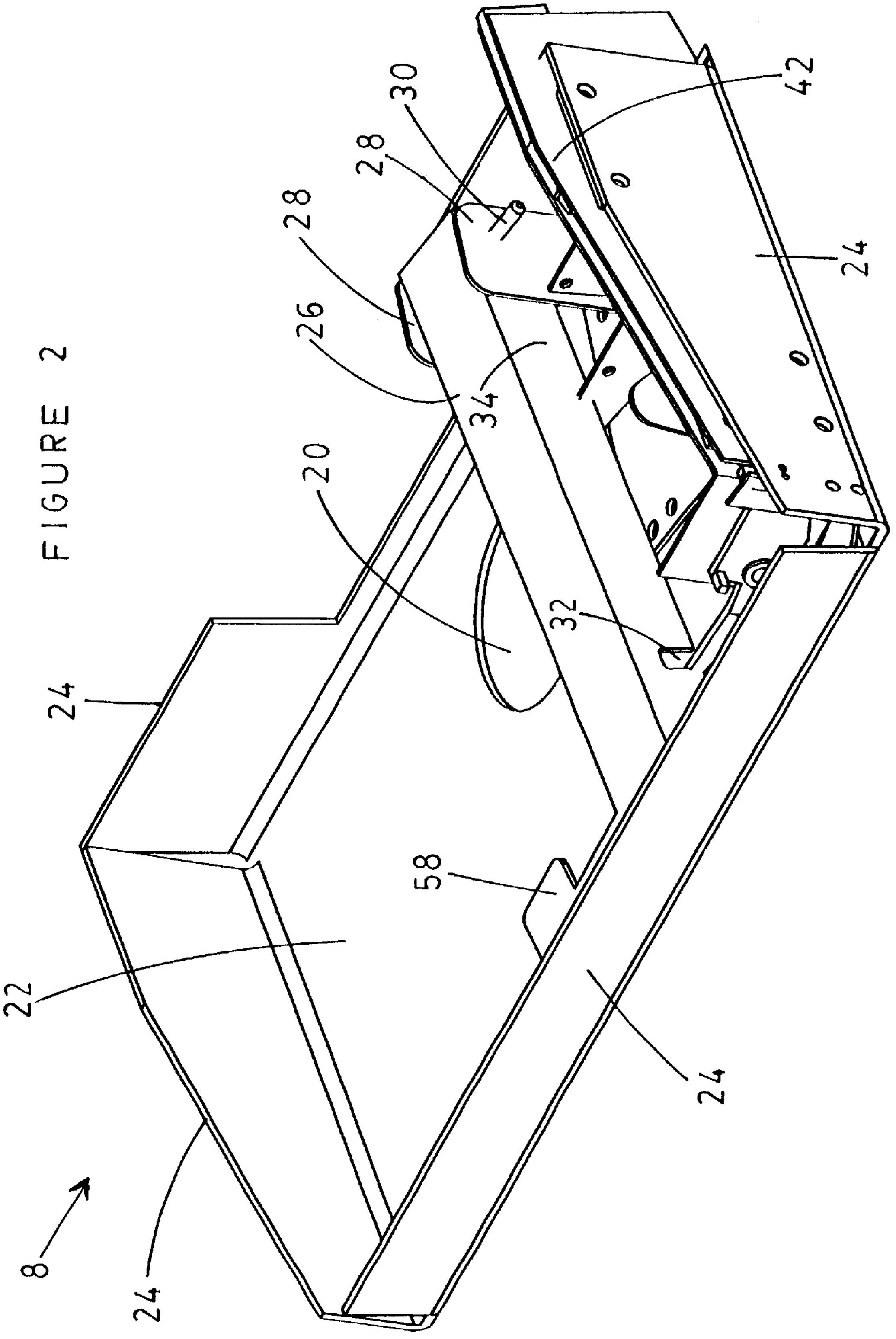
FIG. 2 is a perspective view from a front of the coin mechanism with a housing removed.
Figure 3:
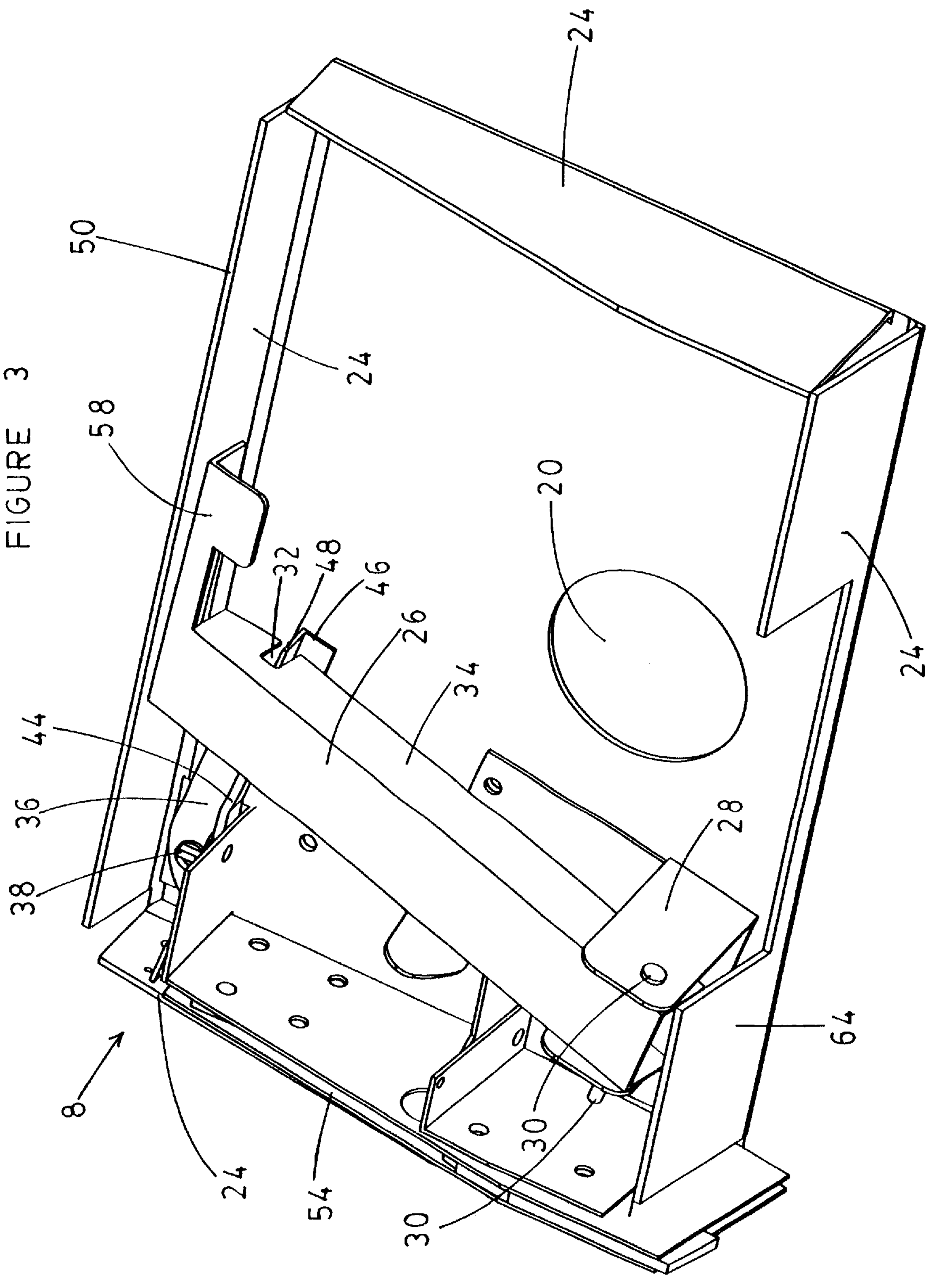
FIG. 3 is a perspective view from the rear of the coin mechanism with the housing removed.

In FIGS. 2–5, an interior of the coin mechanism 8 is disclosed. It can be seen that the coin mechanism 8 has a large circular opening 20 in a central portion thereof A conduit (not shown) extends from beneath the storage container 6 (not shown) to the outlet valve (not shown) preferably through the opening 20. The outlet valve (not shown) could be located on an upper side of the opening 20 so that the conduit (not shown) does not extend through the opening but only the beverage being dispensed passes through the opening. In FIG. 2, an outer shell or housing of the coin mechanism shown in FIG. 1 has been removed. The coin mechanism 8 has a bottom 22 with sides 24. A dispensing bar 26 is pivotally connected to a bracket 28 at pivot point 30. The dispensing bar 26 contains a slot 32 that extends through side edges 34 of the bar 26. Beneath the dispensing bar 26, there is located a locking arm 36 that pivots back and forth about a pivot point 38. The locking arm 36 has a face plate 40 at an end thereof opposite to the dispensing bar 26. The face plate 40 abuts against a slidable longitudinal member 42. As can best be seen from FIG. 3, the locking arm 36 is affixed to a lock actuator 44 having an L-shaped cross section with one horizontal side 46 and one vertical side 48. In a rest position (not shown in the drawings), the locking arm 36 and therefore the lock actuator 44 are pivoted towards a front 50 of the locking mechanism 8 so that the vertical side 48 does not rest immediately beneath the slot 32. In other words, the vertical side 48 is not aligned with the slot 32. The dispensing bar 26 therefore cannot be fully depressed as the side edges 34 will abut against an upper edge of the vertical side 48.

Figure 4:
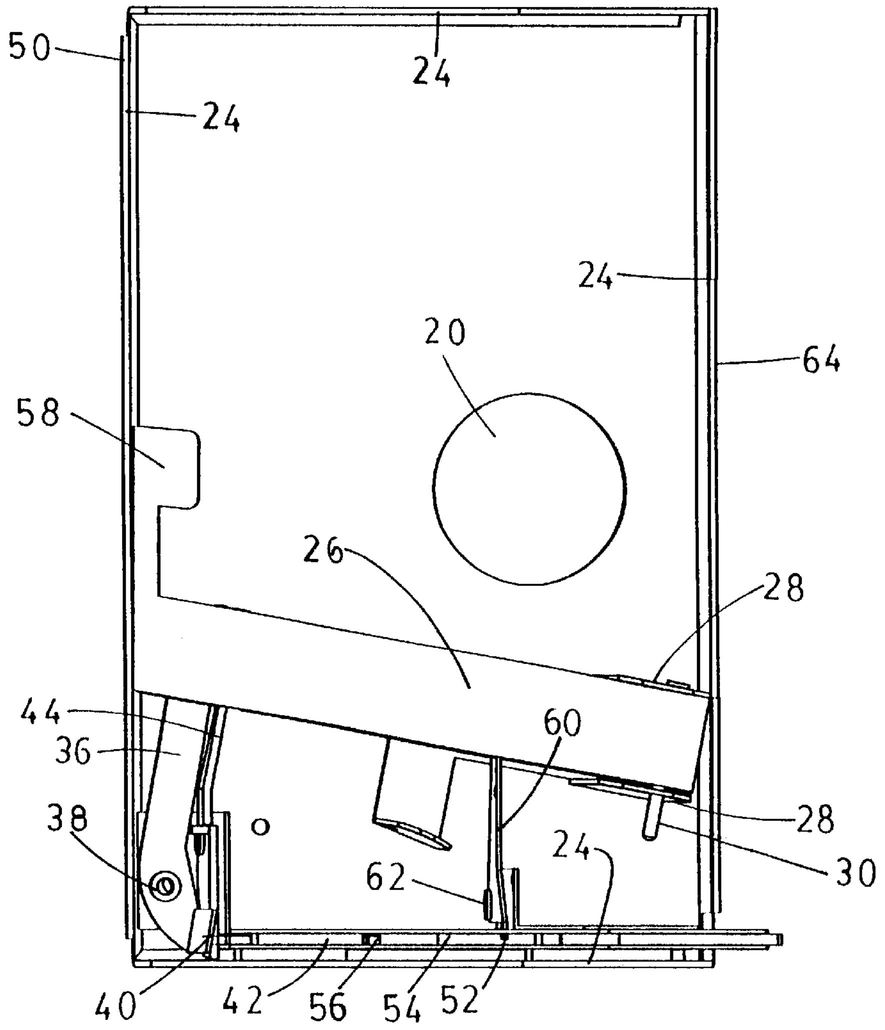
FIG. 4 is a top view of the coin mechanism with the housing removed.
Figure 5:
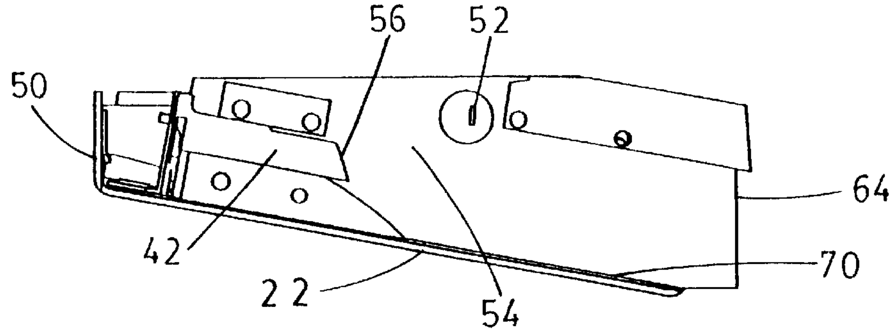
FIG. 5 is a side view of part of the coin mechanism with a side of the housing removed.

From FIGS. 4 and 5, it can be seen that a tab 52 extends outwardly into a coin slot channel 54. When a coin (not shown) is inserted into the coin slot and the coin is of an appropriate size, the coin will just about sit between the tab 52 and a sloped inner end 56 of the elongated member 42. As the coin is inserted, the force of insertion will cause the elongated member 42 to move toward the front 50 of the coin mechanism 8, thereby moving the vertical plate 40 and therefore the locking arm 36 clockwise about the pivot point 38. The movement of the locking arm 36 will cause the lock actuator 44 to move rearward so that the vertical side 48 is directly beneath the slot 32. When the button 16 is manually depressed, the dispenser bar 26 is forced downward so that the vertical face 48 lies within the slot 32. When the dispenser bar 26 is depressed, a valve actuator 58 is also depressed, thereby causing liquid to flow from the storage container 6 into the cup (not shown) located between the outlet valve (not shown) beneath the storage container 6. The downward movement of the dispenser bar 26 causes the coin release arm 60 to pivot about a pivot point 62, thereby moving the tab 52 upward and releasing the coin (not shown) into the interior of the dispenser. As can best be seen from FIGS. 1 and 5, the bottom 22 of the dispenser 8 slopes downward from the front 50 to a rear 64. The coin, once released, rolls along a channel 54 to a storage bin (not shown) located within and beneath the side wall 17 which is hollow. The elongated member 42 is spring mounted so that a spring (not shown) pulls the elongated member towards a rear 64 and the force of the elongated member on the coin moves the coin towards the rear as soon as the tab 52 is moved to release the coin.

The screw hole 19 is designed to receive a screw to hold a panel 68 beneath the base 4. The coins in the storage bin fall through the side wall 17 and come to rest on an inner side (not shown) of the panel 68.

The procedure can then be repeated by inserting another coin (not shown) into another cup (not shown). The outlet valve is not shown in the drawings as it is conventional and opens when the dispenser bar is depressed. The outlet valve is spring-mounted to close when the force from the dispenser bar is removed. A connecting arm (not shown) extends between the valve actuator and the outlet valve. A collar 69 of the coin mechanism fits between the storage container and the base and adds very little height to the dispenser because that part of the coin mechanism is a single sheet of metal (preferably stainless steel) having a thickness of approximately 1⁄32 inches. The coin mechanism is preferably made of metal but could be made of other materials. The side wall 17 is preferably open along the bottom edge to allow access to the coins stored within it when the base 4 and panel 68 are separated from one another.

The base 4 and storage container 6 are conventional. Preferably, the dispenser 2 is sized and shaped to fit within a coffee maker (not shown) so that freshly brewed coffee can drip directly into the storage container through the mouth 11 with the cover (not shown) in place. Preferably, there is a handle (not shown) located at the top 10. Since the entire dispenser 2 is inserted into a coffee maker and since the container 6 and base 4 (i.e. the dispenser less the coin mechanism) is conventional and already sized to fit into the coffee maker, it is important that the addition of the coin mechanism results in the dispenser 2 having substantially the same over all height as the prior art container and base alone without the coin mechanism.

It can be seen that a bottom 70 of channel 54 of the coin mechanism 8 slopes downward from front to rear so that when a coin (not shown) is inserted into the slot 14 and the coin is released after the button 16 is depressed, the coin, which is on its edge, will roll along the bottom 70 of the channel 54 to the rear of the coin mechanism until the coin rolls within the side wall 17 and falls into the storage bin that includes the hollow side wall and an interior space (not shown) between the surface 18 and the panel 68.

I claim:

1. A beverage dispenser comprising a base, a liquid storage container for a beverage supported on said base, said storage container having an outlet valve thereon with a coin mechanism being mounted to control operation of said outlet valve, said coin mechanism having a coin slot therein and activation means for said outlet valve, said beverage dispenser not being connected to an electrical power source, said coin mechanism preventing said activation means from operating said outlet valve unless an appropriate coin or coins are inserted into said coin slot.

2. A beverage dispenser as claimed in claim 1 wherein said storage container is insulated and has an opening covered by a closure that can be removed for filling said container.

3. A beverage dispenser as claimed in claim 1 wherein said coin mechanism is mounted between said base and said storage container.

4. A beverage container as claimed in claim 3 wherein said base has a surface for supporting a cup into which a beverage from said storage container can flow when said activation means is activated.

5. A beverage dispenser as claimed in claim 1 wherein the coin mechanism has a height that does not exceed substantially 1.5 inches.

6. A beverage dispenser as claimed in claim 5 wherein said mechanism is tapered towards a front of said dispenser, said mechanism having a maximum height of substantially 1.5 inches and a minimum height of substantially 0.75 inches.

7. A beverage dispenser as claimed in claim 3 wherein said coin mechanism has a collar, said collar being mounted between said storage container and said base, said coin mechanism increasing an overall height of said dispenser by a thickness of said collar.

8. A beverage dispenser as claimed in claim 7 wherein said collar has a thickness of approximately 1⁄32 of an inch.

9. A beverage dispenser as claimed in claim 1 wherein said coin mechanism has an opening therein to provide an outlet for said beverage in said storage container, said mechanism having a locking arm that is connected to pivot in response to a coin being inserted in the coin slot, said pivoting removing an obstruction from beneath the activation means, thereby permitting said activation means to be activated.

* * * * *